United States Patent
Kao et al.

(10) Patent No.: US 9,235,827 B2
(45) Date of Patent: Jan. 12, 2016

(54) NOTIFICATION HARDENING

(71) Applicant: Microsoft Corporation, Redmond, WA (US)

(72) Inventors: Chih-Pin Ben Kao, Redmond, WA (US); Hakki Tunc Bostanci, Redmond, WA (US); Asish George Varghese, Redmond, WA (US); Vinod Chavva, Redmond, WA (US); Robert Edgar Fanfant, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 274 days.

(21) Appl. No.: 13/668,581

(22) Filed: Nov. 5, 2012

(65) Prior Publication Data

US 2014/0129977 A1    May 8, 2014

(51) Int. Cl.
*G06Q 10/10* (2012.01)
(52) U.S. Cl.
CPC ..................................... *G06Q 10/10* (2013.01)
(58) Field of Classification Search
CPC ..... G06F 9/542; G06F 3/0481; G06F 9/4443; G06F 3/14; G06F 9/52; H04L 51/04; G09G 5/14
See application file for complete search history.

(56) References Cited

U.S. PATENT DOCUMENTS

| 7,155,729 | B1* | 12/2006 | Andrew et al. | 719/318 |
|---|---|---|---|---|
| 7,437,759 | B1 | 10/2008 | Szor | |
| 7,614,083 | B2 | 11/2009 | Khuti et al. | |
| 8,201,029 | B2 | 6/2012 | Jann et al. | |
| 8,205,260 | B2 | 6/2012 | Obrecht et al. | |
| 2004/0095401 | A1* | 5/2004 | Tomimori | 345/864 |
| 2005/0119902 | A1* | 6/2005 | Christiansen | 705/1 |
| 2006/0075044 | A1* | 4/2006 | Fox et al. | 709/206 |
| 2008/0046524 | A1* | 2/2008 | Jerding et al. | 709/206 |
| 2008/0046977 | A1* | 2/2008 | Park | 726/4 |
| 2008/0083031 | A1 | 4/2008 | Meijer et al. | |
| 2008/0107057 | A1* | 5/2008 | Kannan et al. | 370/312 |
| 2008/0215472 | A1* | 9/2008 | Brown | 705/35 |
| 2009/0049550 | A1 | 2/2009 | Shevchenko | |
| 2009/0077188 | A1* | 3/2009 | Arneson et al. | 709/206 |

OTHER PUBLICATIONS

"Endpoint Attack and Penetration", SecureState, retrieved on: Jul. 27, 2012, Available at: http://www.securestate.com/Services/Incident%20Response/Pages/Endpoint-Attack-and-Penetration.aspx, 3 pgs.

(Continued)

*Primary Examiner* — Boris Pesin
*Assistant Examiner* — Mandrita Brahmachari
(74) *Attorney, Agent, or Firm* — John Jardine; Judy Yee; Micky Minhas

(57) ABSTRACT

A computing device may include at least one primary notification module and at least one secondary notification module. A notification controller module may trigger a primary notification module and a secondary notification module to generate notification messages or the controller module may trigger the primary notification module to generate a notification message. A graphics device may generate a composite notification message based at least in part on the notification messages from the primary and the secondary notification modules, where representations of the notification messages are stacked one on-top of the other in the composite notification message.

20 Claims, 5 Drawing Sheets

(56) References Cited

OTHER PUBLICATIONS

Krahmer, "Hardened OS Exploitation Techniques", Published on: Jul. 2004, Available at: https://eldorado.tu-dortmund.de/bitstream/2003/22817/1/DIMVA2004-SP-Krahmer.pdf, 8 pgs.

"Symantec (TM) Critical System Protection", Data Sheet: Endpoint Security, retrieved on: Jul. 26, 2012, Available at: http://www.emea.symantec.com/info/sonar/documents/Symantec%20Critical%20System%20Protection.pdf, 5 pgs.

"Lesson 2: Understanding User Account Control (UAC)", TechNet Library, retrieved on: Jul. 27, 2012, Available at: http://technet.microsoft.com/en-us/library/cc505883.aspx, 9 pgs.

Bahmann, et al., "Extending Futex for Kernel to User Notification", In Proceedings of ACM SIGOPS Operating Systems Review—Research and Developments in the Linux Kernel, vol. 42, Issue 5, Jul. 5, 2008, 9 pages.

* cited by examiner

NOTIFICATION HARDENING

BACKGROUND

Computing devices may include notification systems to provide users with notifications. The notifications provided by a notification system of a computing device may pertain to, among other things, rights granted to the computing device. For example, the computing device may have unregistered software installed thereon, and the notification system may provide a user with a notification to register the software. As another example, the computing device may provide notifications pertaining to rights that may have expired, e.g., a notification that a rental period has ended.

SUMMARY

In some embodiments, a user device may include at least one primary notification module and at least one secondary notification module. A notification controller module may trigger a primary notification module and a secondary notification module to generate notification messages. A graphics device may generate a composite notification message based at least in part on the notifications messages from the primary and the secondary notification modules, where representations of the notification messages are stacked one on-top of the other in the composite notification message.

In some embodiments, a user device may include a primary notification module and multiple secondary notification modules. The primary notification module may provide global notifications for the user device. Each one of the secondary notification modules may be associated with a system resource of the user device, and each secondary notification module may provide notifications that pertain to its corresponding system resource. In some embodiments, the only notifications provided by a secondary notification module are notifications that pertain to its corresponding system resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure describes a user-device that provides hardened notifications. The hardened notifications may be implemented in a manner that makes it difficult for an unauthorized person, or hacker, to circumvent or disable notifications. For example, a hacker may desire to sell or distribute unauthorized copies, i.e., pirated copies, of programs, operating systems, digital content, etc., to unsuspecting end-users, and if the hacker cannot circumvent or disable notifications, to the end-user, that a copy of a program, operating system, digital content, etc. is unauthorized, then the hardened notification may thwart the hacker's ability to sell or distribute unauthorized copies.

A hardened notification may be displayed on a display device of a user device and may be comprised of multiple messages, with one overlaid on top of the other. In some instances, the multiple messages may have identical text and may be overlaid such that an uppermost message is visible to a user and an identical lower message is not visible.

In some instances, at least one of the multiple messages of a hardened notification may be from a primary notification module and at least one of the multiple messages of the hardened notification may be from a secondary notification module.

In some instances, the primary notification module may be configured to provide global notifications for the user-device, and the secondary notification module may be configured to provide specific notifications, e.g., notifications pertaining to one particular program module.

In some instances, the primary notification module and the secondary notification module may be triggered by a common controller, but may be otherwise independent of each other. Consequently, if a hacker disables or circumvents the primary notification module, the secondary notification module may still provide notifications to the end-user, and the hacker, viewing the notification from the secondary notification module, may, in some instances, not realize that efforts to disable or circumvent the primary notification module were in fact successful. Similarly, if a hacker disables or circumvents the secondary notification module, the primary notification module may still provide notifications to the end-user, and the hacker, viewing the notification from the primary notification module, may, in some instances, not realize that efforts to disable or circumvent the secondary notification module were in fact successful.

In some instances, the secondary notification module may be embodied in a system library and/or executable, and the secondary notification module may be included in service packs and/or system updates. Thus, even if a hacker succeeds, temporarily, in disabling the secondary notification module, the disabled secondary notification module may be patched upon the user device receiving a new service pack and/or system update.

Illustrative Environment

Figure 1:
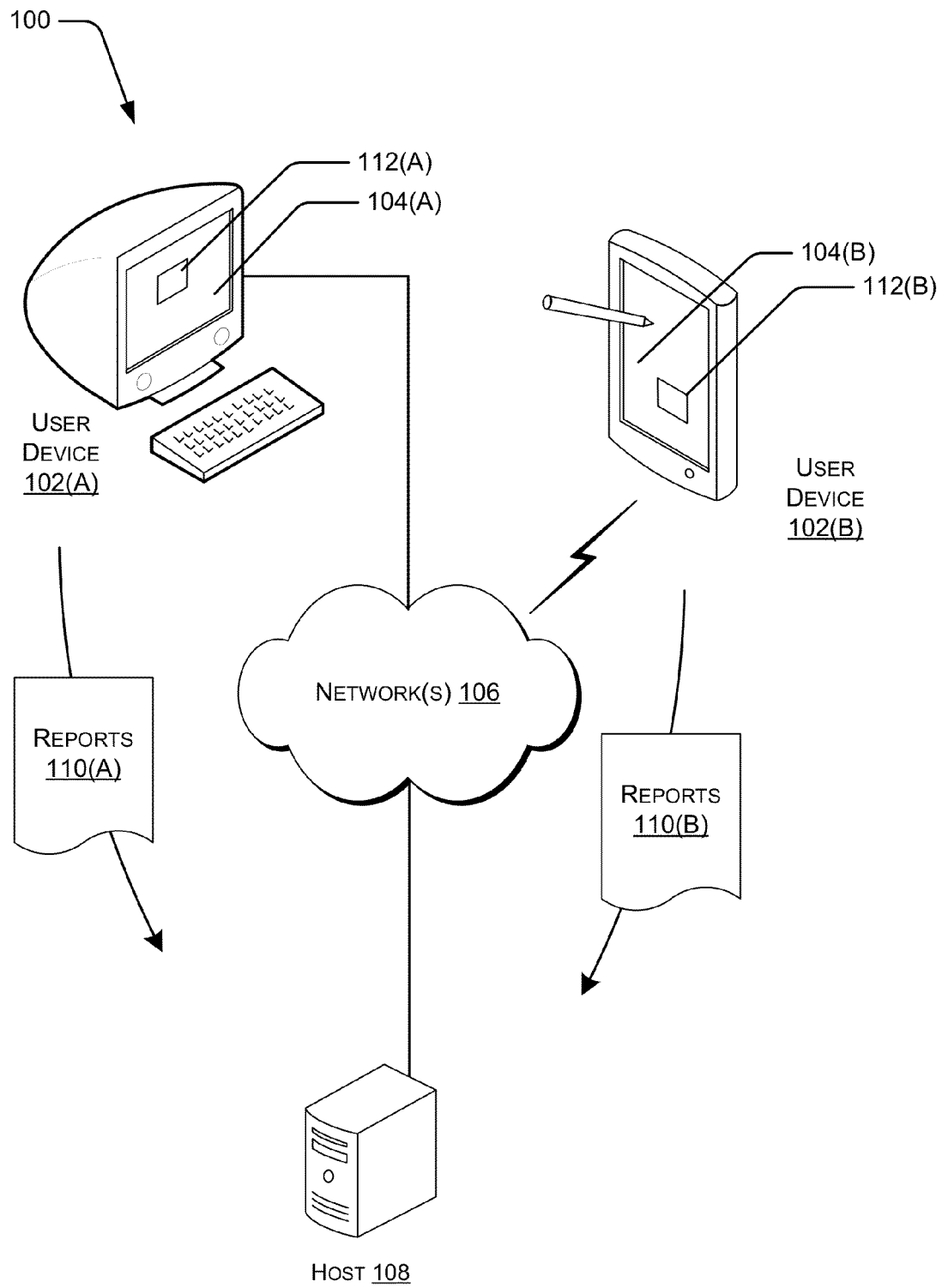
FIG. 1 is a schematic diagram of an illustrative environment in which hardened notifications are provided.

FIG. 1 is a schematic diagram of an illustrative environment 100 in which hardened notifications are provided. The environment 100 includes user devices 102(A) and 102(B) (collectively referred to as user device 102) with a display device 104(A) and 104(B), respectively. The environment 100 may also include one or more network(s) 106 and a host 108. The user devices 102(A) and 102(B) may be communicatively coupled to the host 108 via the one or more network(s) 106. The user devices 102(A) and 102(B) may provide the host 108 with reports 110(A) and 110(B), respectively, which may include device configuration reports and device compliance reports. Device configuration reports may include information on the current configuration of the user device 102(A), 102(B), e.g., hardware information such as processor(s) description, memory description, types of drives, etc., and software information such as software currently stored in the user device 102(A), 102(B). Device compliance reports may include information on whether the user device 102(A), 102(B) is in compliance with various granted device rights such as licenses for, among other things, software stored in the user device 102(A), 102(B).

User devices 102(A) and 102(B) may be, among other things, a desktop computer, a laptop computer, a netbook computer, a tablet computer, a personal digital assistance (PDA), a gaming device, a media player, a mobile telephone, a smart phone, or any other computing device. The display device 104 may be, among other things, a monitor, a flat screen display (e.g., liquid crystal display), touch screen display, etc.

The display device 104(A) of the user device 102(A) displays a hardened notification 112(A). The hardened notification 112(A) may pertain to device compliance of the user device 102(A). For example, the hardened notification 112(A) may pertain to an application or program module for which the user device 102(A) does not have current rights.

Similarly, the display device 104(B) of the user device 102(B) displays a hardened notification 112(B). The hardened notification 112(B) may pertain to device compliance of the user device 102(B).

The network(s) 106 may include wired and/or wireless networks that enable communications between the various entities in the environment 100. In some embodiments, the network(s) 106 may include local area networks (LANs), wide area networks (WAN), mobile telephone networks (MTNs), and/or other types of networks, possibly used in conjunction with one another, to facilitate communication between the host 108 and the user device(s) 102.

The host 108 may be an entity that receives the reports 110. In some instances, the host 108 may be a compliance monitor. The host 108 may determine whether a user device 102 is in compliance with rights granted to the user device 102. For example, in some instances, the host 108 may determine, among other things, whether software executed by, or stored in, the user device 102 is registered and/or is licensed to the user device 102.

Illustrative User Device

Figure 2:
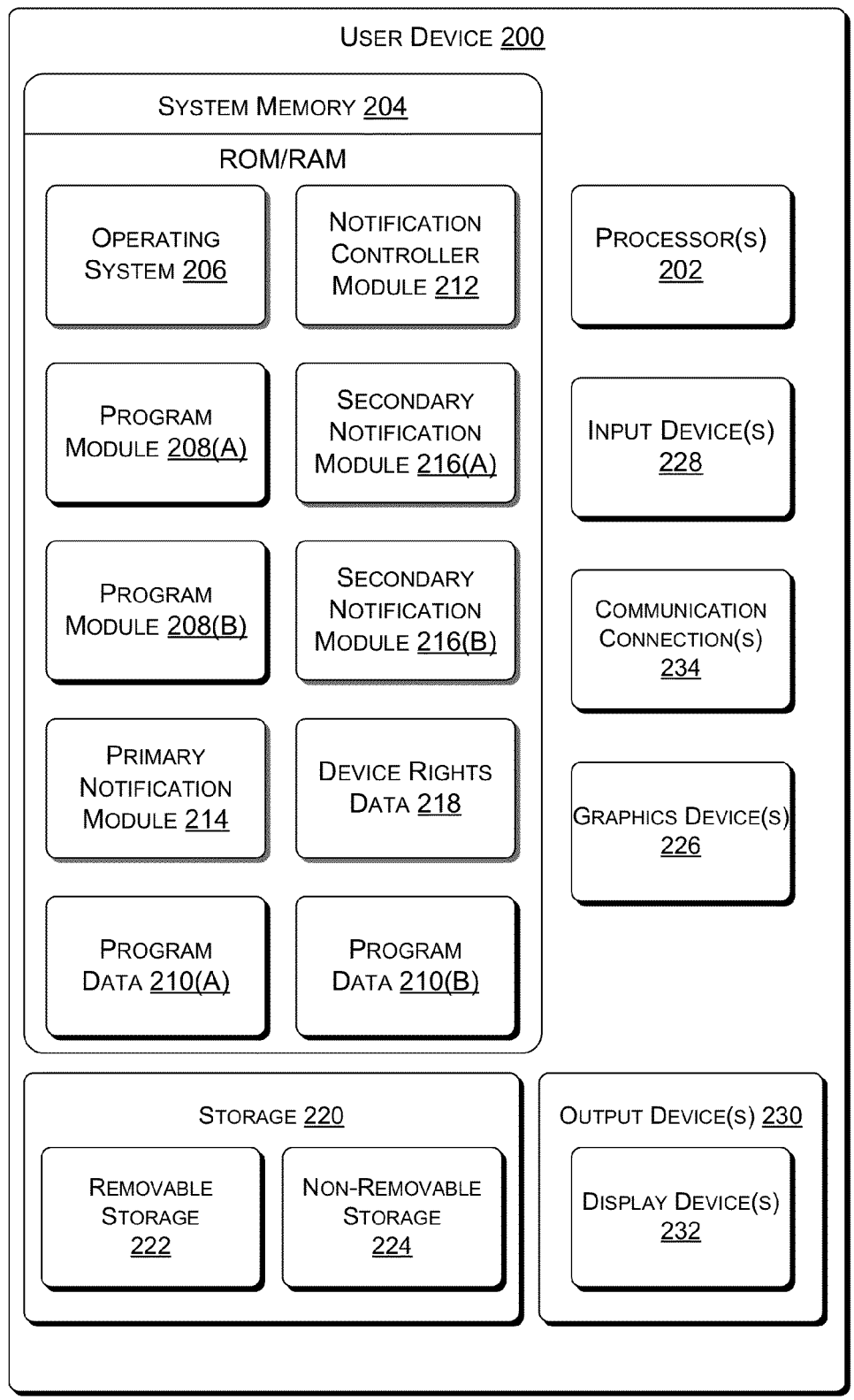
FIG. 2 is a schematic diagram of example user device useable to impliment hardened notifications.

FIG. 2 is a schematic diagram of a user device 200 that may be employed in the illustrative environment 100 of FIG. 1. The various embodiments described above may be implemented in other user devices, systems, and environments. The user device 200 shown in FIG. 2 is only one example of a user device and is not intended to suggest any limitation as to the scope of use or functionality of the computer and network architectures. The user device 200 is not intended to be interpreted as having any dependency or requirement relating to any one or combination of components illustrated in the example user device.

In a very basic configuration, the user device 200 typically includes at least one processor 202 and system memory 204. Depending on the exact configuration and type of user device, the system memory 204 may be volatile (such as RAM), non-volatile (such as ROM, flash memory, etc.) or some combination of the two. The system memory 204 typically includes an operating system 206, program modules 208(A) and 208(B) (collectively referred to as program module 208), and may include program data 210(A) and 210(B) (collectively referred to as program data 210). The program modules 208(A) and 208(B) may include applications that may be from an entity that provided the operating system 206 and/or from other entities. The program data 210(A) and the program data 210(B) may include various inputs/outputs to/from the program modules 208(A) and 208(B), respectively. The program modules 208 and program data 210 may be binaries, and in some instances, some or all of the program modules 208 and/or some or all of the program data 210 may be encrypted, when stored, and may be decrypted while executed by the processor 202.

The system memory 204 may include a notification controller module 212, a primary notification module 214, and secondary notification modules 216(A) and 216(B), and device rights data 218. The device rights data 218 may include rights granted to the user device 200 such as, but not limited to, rights for the operating system 206 and/or program modules 208, e.g., licenses, expiration dates, etc.

The user device 200 may include additional data storage 220 (removable and/or non-removable) such as, for example, solid-state drives, magnetic disks, optical disks, or tape. Such additional storage is illustrated in FIG. 2 by removable storage 222 and non-removable storage 224. One or more, or all, of the operating system 206, the program modules 208, the program data 210, the notification controller module 212, the primary notification module 214, the secondary notification modules 216(A) and 216(B) and the device rights data 218 may additionally or alternatively be stored in storage 220. The operating system 206, the notification controller module 212 and the primary notification module 214 may be loaded into the system memory 204 during a boot-up procedure of the user device 200. The program module 208(A), program data 210(A) for the program module 208(A) and the corresponding secondary notification module 216(A) for the program module 208(A) may be loaded into the system memory 204 when the program module 208(A) is invoked (e.g., started by a user) and/or during a boot-up procedure of the user device 200. The device rights data 218 may be loaded into the system memory 204 when needed by the notification controller module 212, during a boot-up procedure of the user device 200, or when a program module 208 is invoked.

In some instances, some or all of the operating system 206, modules 208-216 and/or device rights data 218 may be encrypted when stored in storage 220 and may be encrypted when loaded into system memory 204 and/or executed by processor 202.

In some instances, encryption may be employed to, among other things, obfuscate the secondary notification modules 216. In some instances, different secondary notification modules 216 may be encrypted using different encryption protocols and/or different encryption keys. When a digital object is encrypted, values of individual bits of the object are transformed, and the transformation depends on both the encryption protocol employed and the encryption key. Assume that the secondary notification modules 216(A) and 216(B) have an identical string of bits, then by employing either different encryption protocols and/or different encryption keys to encrypt the secondary notification module 216(A) and the secondary notification module 216(B), the identical strings of bits are transformed differently. Consequently, an unauthorized person, or hacker, desiring to disable notifications will not be able to search for identical strings of bits, which correspond to secondary notification modules 216(A) and 216(B), so as to locate and disable multiple ones of the secondary notification modules 216.

The notification controller module 212 monitors system activity and determines whether to trigger a notification message based at least in part on the monitored system activity. The notification controller module 212 may determine whether to trigger a notification message based at least in part on the device rights data 218. In some instances, the notification controller module 212 may monitor system activity by, among other things, intercepting resource requests. In some instances, resource requests may be encrypted, and in that case, the notification controller module 212 may decrypt the resource requests. The notification controller module 212 may receive a resource request from a program module 208 and may determine whether the user device 200 has the appropriate rights for the program module 208 based at least in part on the device rights data 218. For example, the notification controller module 212 may determine whether the program module 208 is registered with an appropriate entity, e.g., host 108, and/or may determine whether a device right for the program module 208 is valid or invalid. As nonlimiting examples, a device right for the program module 208 may be invalid if it has expired, or if the device right for the program module 208 was granted to a different user device.

The notification controller module 212 may trigger the primary notification module 214 and one or more of the secondary notification modules 216 to provide a notification message. A notification message from the primary notification module 214 and a notification message from the one or more of the secondary notification modules 216 may be identical and/or may have message content that is identical.

In some embodiments, the notification controller module 212 may include a randomizer submodule. Upon determining to provide a notification message, the randomizer submodule may be employed to determine whether to trigger one or more of the secondary notification modules 216 such that triggering of the secondary notification modules 216 may appear to be random.

In some embodiments, either one, or both, of the notification controller module 212 and the primary notification module 214 may be incorporated into components of the operating system 206. For example, the operating system 206 may have a kernel acting as a bridge between program modules 208 and hardware components of the user device 200, and the notification controller module 212 and/or the primary notification module 214 may be incorporated into the kernel. As another example, the operating system 206 may provide "windows" via a graphical-user-interface (GUI), and the notification controller module 212 and/or the primary notification module 214 may be incorporated into a windows manager. Incorporating the notification controller module 212 and/or the primary notification module 214 into components of the operating system 206 provides a measure of security. A hacker will have a difficult time (a) locating the notification controller module 212 and/or the primary notification module 214 when they are hidden within the operating system 206 and (b) disabling notifications while keeping the operating system 206 otherwise fully functional.

In some embodiments, the secondary notification modules 216 may be incorporated into the program modules 208 and/or the program data 210. A hacker will have a difficult time (a) locating a secondary notification module 216 when it is hidden within program module 208 and/or program data 210 and (b) disabling notifications while keeping the program module 208 otherwise fully functional. In some instances, there may be N program modules 208 loaded in the user device 200, where N is an integer, and of the N program modules 208, M of the program modules 208 may have a corresponding secondary notification module 216, where M is an integer less than or equal to N. In some instances, the M corresponding secondary notification modules 208 may be encrypted using different encryption protocols and/or different encryption keys. Encrypting the M corresponding secondary notification modules 208 differently from each other will make it difficult for a hacker to identify all of the M secondary notification modules 208, especially as M grows larger.

Typically, the primary notification module 214 and the secondary notification modules 216 execute as separate processes in the operating system 206. If a hacker tampers, alters, disables either the primary notification module 214 or the secondary notification module 216, the remaining notification modules is unaffected by the tampering, alteration, disablement of the other notification module for at least the reason that the primary notification module 214 and the secondary notification modules 216 execute as separate processes in the operating system 206.

In some embodiments, the primary notification module 214 may generate a notification message by invoking system calls, scripts, tasks, routines, application program interfaces (APIs), etc. The notification message generated by the primary notification module 214 may incorporate aspects of a graphical user interface such as, but not limited to, opening/closing pop-up windows and providing user-input such as user-selection buttons.

Similarly, in some embodiments, the secondary notification module 216 may generate a notification message by invoking system calls, scripts, tasks, routines, application program interfaces (APIs), etc.

However, in some instances, tools, such as tools in a software development kit (SDK) for the operating system 206, may exist that may assist a hacker in targeting/locating the primary notification module 214 based at least in part on the primary notification module 214 invoking system calls, scripts, tasks, routines, application program interfaces (APIs), etc. Consequently, in some embodiments, the secondary notification module 216 may be, in comparison to the primary notification module 214, less complex, more specialized and more robust. For example, the secondary notification module 216 may provide a notification message in which message content is a bitmap. Bitmaps of message content may be stored in system memory 204 and/or in storage 220 and may be, in some instances, encrypted.

Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 204 and the storage 220 are examples of computer storage media. Computer storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other storage medium that can be used to store the desired information and which can be accessed by the user device 200. Any such computer storage media may be part of the user device 200. Moreover, the computer-readable media may include computer-executable instructions that, when executed by the processor(s) 202, perform various functions and/or operations described herein.

In contrast, communication media may embody computer-readable instructions, data structures, program modules, or other data in a modulated data signal, such as a carrier wave. As defined herein, computer storage media does not include communication media.

The user device 200 may also include graphics device(s) 226. Notification messages may be received by the graphics device(s) 226 and may be drawn in the graphics device(s) 226. The graphics device(s) 226 may comprise a memory and a processing unit such as, but not limited to, a graphical processing unit, and the processing unit of the graphics device(s) 226 may draw notification messages in the memory of the graphics device(s) 226. The graphics device 226 provides graphical information that is drawn on a display device 232.

The user device 200 may also have input device(s) 228 such as keyboard, mouse, pen, voice input device, touch input device, motion or gesture input, etc. Output device(s) 230 such as the display device 232, speakers, printer, etc. may also be included. These devices are well known in the art and are not discussed at length here.

The user device 200 may also contain communication connections 234 that allow the user device 200 to communicate with other devices such as the host 108.

The illustrated user device 200 is only one example of a suitable device and is not intended to suggest any limitation as to the scope of use or functionality of the various embodiments described. Other well-known user devices, systems, environments and/or configurations that may be suitable for use with the embodiments include, but are not limited to, personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Illustrative System-Flow

Figure 3:
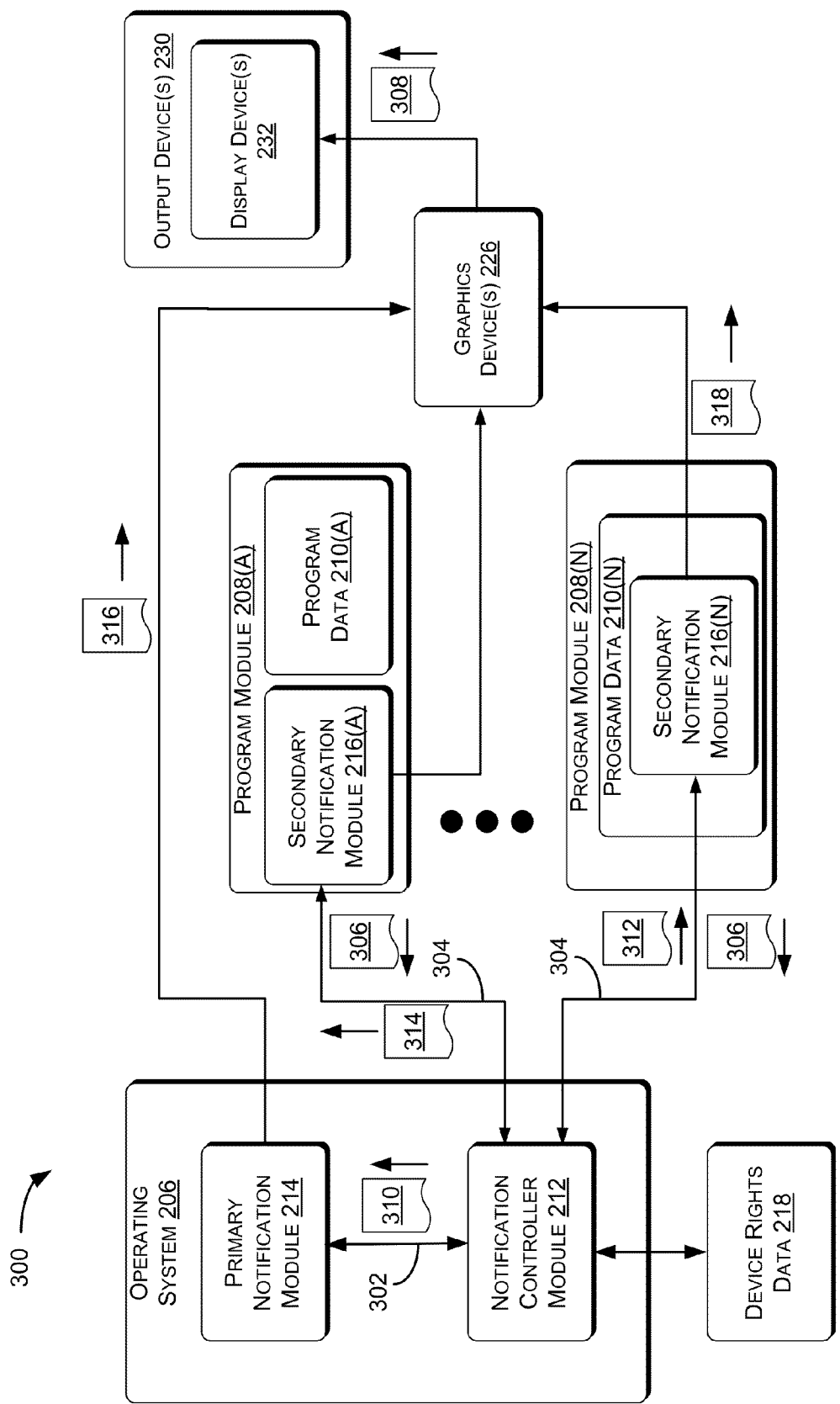
FIG. 3 is a block diagram of an illustrative system flow for providing hardened notifications.

FIG. 3 is a block diagram of an illustrative system flow 300 for providing hardened notifications. In the illustrated embodiment, the notification controller module 212 and the primary notification module 214 reside in the operating system 206. In other embodiments, either one or both of the notification controller module 212 and the primary notification module 214 may reside outside of the operating system 206. The notification controller module 212 and the primary notification module 214 may communicate via a secure communication channel 302. In some embodiments, communications between the notification controller module 212 and the primary notification module 214 may be obfuscated and/or encrypted. The encryption may be based on either symmetric or asymmetric cryptographic keys.

The notification controller module 212 may be in communication with one or more secondary notification modules 216 via secure communication channels 304. In some embodiments, communications between the notification controller module 212 and secondary notification modules 216 may be obfuscated and/or encrypted, and the encryption may be based on either symmetric or asymmetric cryptographic keys. In the illustrated embodiment, a secondary notification module 216(1) may reside in a corresponding program module 208(1), and another secondary notification module 216(N) may reside in program data 210(N) for a corresponding program module 208(N). In some embodiments, secondary notification modules may reside outside of program modules 208. The secondary notification module 216(1) and the secondary notification module 216(N) may be triggered by the notification controller module 212 to provide notifications that may pertain to, or be specific to, the program module 208(1) and the program module 208(N), respectively.

During operations of the user device 200, the program modules 208 may provide the operating system 206 with messages 306 for requesting system resources. The notification controller module 212 may intercept the messages 306. The notification controller module 212 may be triggered by a message 306 to determine whether a composite notification message 308 should be provided a user via the display device 232. In some instances, the notification controller module 212 may determine that a user should be provided with the composite notification message 308 and may send a primary notification trigger message 310 to the primary notification module 214 and a secondary notification trigger message 312 to a secondary notification module 216. In some instances, after determining that a user should be provided with the composite notification message 308, the notification controller module 212 may send the primary notification trigger message 310 to the primary notification module 214 and may optionally send the secondary notification trigger message 312 to the secondary notification module 216. In some instances, whether the notification controller module 212 sends the secondary notification trigger message 312 to the secondary notification module 216 may be stochastic.

In some instances, the notification controller module 212 may determine to not provide a user the composite notification message 308 and may send a resource message 314 to a program module 208. The resource message 314 may provide the requested resources to the program module 208.

Typically, the notification controller module 212 may determine the program module 208 that sent a message 306 based at least in part on the message 306, e.g., the message 306 may include an identifier for program module 208(1) or an identifier for program module 208(N). The notification controller module 212 may determine whether, or not, to provide a user the composite notification message 308 to a user based at least in part on a number of factors such as, but not limited to, device rights and/or temporal considerations (e.g., a time span between consecutive notifications). For example, the notification controller module 212 may review device rights data 218 to determine whether the user device 200 has appropriate rights to the identified program module 208, and even if the user device 200 does not have appropriate rights to the identified program module 208, the notification controller module 212 may determine to not provide the composite notification message 308 if a previous composite notification message was provided within a given time-span. In some instances, the notification controller module 212 may determine whether or not to provide the composite notification message 308 based at least in part on content of the composite notification message 308 and of a previous composite notification message. In some instances, the notification controller module 212 may determine whether or not to provide the composite notification message 308 based at least in part on whether the composite notification message 308 and a previous composite notification message pertain to or are associated with the same program module 208. For example, if the composite notification message 308 and a previous composite notification message (not shown) pertain to or are associated with the program module 208(1) and the program module 208(N), respectively, the notification controller module 212 may determine to provide the composite notification message 308 and such determination may be independent of a time-span between when the previous composite notification message was provided and the time at which the composite notification message 308 is provided.

The notification controller module 212 may provide the primary notification module 214 with the primary notification trigger message 310 upon determining to provide the composite notification message 308. The primary notification trigger message 310 may indicate a notification message type. The primary notification module 214 may generate a primary notification message 316 based at least in part on the primary notification trigger message 310. Typically, the primary notification module 214 may employ application program interfaces (APIs) for a graphical user interface of the operating system 206 to render at least a portion of the composite notification message 308. For example, the primary notification module 214 may generate the composite notification message 308 in a pop-up window of a graphical user interface of the operating system 206.

The notification controller module 212 may provide the secondary notification module 216 with the secondary notification trigger message 312 upon determining to provide the composite notification message 308. The secondary notification trigger message 312 may indicate a notification message type. The secondary notification module 216 may generate a secondary notification message 318 based at least in part on the secondary notification trigger message 312. In some embodiments, the secondary notification message 318 may include a bitmap of a text message such that the text message bitmap is identical to a message contained in the primary notification message 316.

The graphics device 226 may receive the primary notification message 316 and the secondary notification message 318. The graphics device 226 may draw objects, texts, windows, etc. in accordance with z-ordering, where z-order refers to the order of objects along the Z-axis (perpendicular to the surface of the display device 232). In drawing a representation of the primary notification message 316, the graphics device 226 may open a window and may draw text corresponding to the primary notification message 316 within the window in a particular range of display coordinates (X, Y, Z) and the graphics device 226 may draw text corresponding to the secondary notification message 318 in the same range of X and Y display coordinates but in a different z-order. In some instances, the graphics device 226 may draw text corresponding to the secondary notification message 318 to have a lower z-order value than that of the primary notification message 316. In some instances, the graphics device 226 may draw text corresponding to the secondary notification message 318 to have a higher z-order value than that of the primary notification message 316. In some instances, the graphics device 226 may draw text corresponding to the secondary notification message 318 at least twice and with different z-order values such that the z-order value of the representation of the primary notification message 316 is positioned between at least two representations of the secondary notification message 318.

Illustrative Operation

Figure 4:
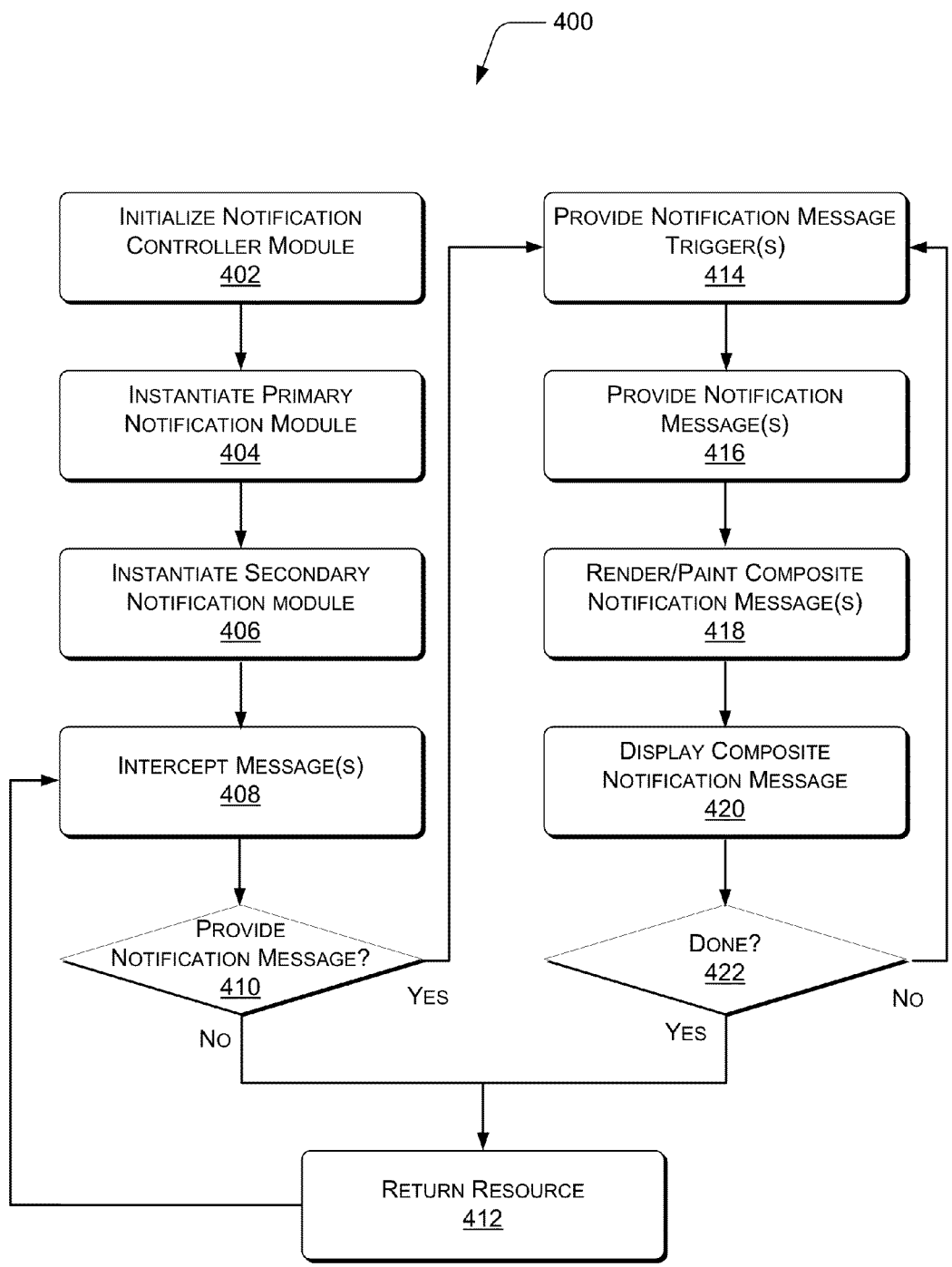
FIG. 4 is a flow diagram of an illustrative process for providing hardened notifications

FIG. 4 is a flow diagram of an illustrative process 400 for providing notifications. The process 400 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be omitted, and/or combined in any order and/or in parallel to implement the process. Other processes described throughout this disclosure, including processes described hereinafter, shall be interpreted accordingly.

At 402, the notification controller module 212 is initialized. The initialization may occur when the user device 200 boots up. The notification controller module 212 may start a timer to track system uptime.

At 404, the primary notification module 214 may be instantiated. In some embodiments, instantiation of the primary notification module 214 may occur as part of a boot-up procedure. In some embodiments, the notification controller module 212 may cause the primary notification module 214 to be instantiated. In some embodiments, the primary notification module 214 may be executed under a system-process or a nonuser-process.

At 406, a program module 208 may be instantiated. In some instances, a secondary notification module 216, which is associated with or corresponds to the program module 208, may instantiated along with, or subsequent to, the program module 208. In some instances, the program module 208 may include the corresponding secondary notification module 216. In some instances, the program module 208 and the corresponding secondary notification module 216 be retrieved from storage 220 and loaded into system memory 204. The program module 208 and/or the corresponding notification module 216 may be encrypted in storage 220 and may be decrypted prior to execution by the processor 202 or may be decrypted prior to loading into system memory 204. In some instances, the program module 208 may be instantiated in response to a user activating the program module 208 by, for example, clicking on an icon of the program module 208, and instantiation of the program module 208 may cause the corresponding secondary notification module 216 to be instantiated. In other instances, the corresponding secondary notification module 216 and/or the program module 208 may be instantiated automatically.

At 408, the notification controller module 212 may intercept messages 306, from the program module 208, for requesting system resources.

At 410, the notification controller module 212 may determine whether to provide a user with a composite notification message 308. In some instances, the message 308 may be encrypted, and the notification controller module 212 may decrypt the composite notification message 308. The notification controller module 212 may make the determination on whether or not to provide the composite notification message 308 on a number of factors such as, but not limited to, system checks (e.g., whether the system uptime has passed a threshold amount, whether a time interval between consecutive composite notification messages 308 has passed a threshold amount, whether a time interval consecutive composite notification messages 308, in which the consecutive composite notification messages 308 have the same content, has passed a threshold amount, etc.) and granted device-rights (e.g., whether the appropriate rights have been granted to the user device 200, whether granted rights are valid, whether granted rights are expired, etc.). If the decision is negative, then the process continues at 412, otherwise the process continues at 414.

At 412, the notification controller module 212 may provide the program module 208 with a resource message 314 to provide the program module 208 with requested resources. In some instances, the resource message 314 may be encrypted. The process may then return to 408 and wait upon another message 306 to intercept.

At 414, the notification controller module 212 may provide a primary notification trigger message 310 to the primary notification module 214 and may provide a secondary notification trigger message 312 to the secondary notification module 216. In some embodiments, either one or both of the primary notification trigger message 310 or the secondary notification trigger message 312 may be encrypted. In some instances, the notification controller module 212 may control when the primary notification trigger message 310 and the secondary notification trigger message 312 are sent. In some instances, the notification controller module 212 may send the primary notification trigger message 310 and the secondary notification trigger message 312 in a fixed order, e.g., the primary notification trigger message 310 may be sent before the secondary notification trigger message 312 or vice-versa. In other instances, the notification controller module 212 may send the primary notification trigger message 310 and the secondary notification trigger message 312 in a random order.

In some embodiments, the notification controller module 212 may determine a respective z-order level for the primary notification message 316 and the secondary notification message 318. The notification controller module 212 may include a respective z-order indicator in the primary notification trigger message 310 and the secondary notification trigger message 312. In some instances, the notification controller module 212 may order the primary notification message 316 and the secondary notification message 318 in a fixed manner, e.g., the primary notification message 316 may be displayed onto of the secondary notification message 318 or vice-versa. In some instances, the notification controller module 212 may order the primary notification message 316 and the secondary notification message 318 in a random manner.

In some embodiments, the notification controller module 212 may randomly determine whether or not to send the secondary notification message 318 (i.e., sometimes the secondary notification message 318 is sent and other times the secondary notification message 318 is not sent). The randomness of sending the secondary notification message 318 should make it more difficult for a hacker to disable notifications.

In some embodiments, the notification controller module 212 may provide more than one secondary notification trigger message 312 for a corresponding primary notification trigger message 312. The notification controller module 212 may include a z-order indicator for a z-order level in the corresponding primary notification trigger message 310 and in each of the secondary notification trigger messages 312. The notification controller module 212 may chose the respective z-order levels such that in the composite notification message 308, message content of primary notification message 316 interposes message content of the secondary notification messages 318.

In some embodiments, the secondary notification trigger message 312 may include a flag or indicator of a number of copies for message content of the secondary notification message 318. For example, the notification controller module 212 may determine that the composite notification message 308 should contain two copies of the message content of the secondary notification message 318, and in that case, a flag or an indicator of the secondary notification message 318 may be set, by the notification controller module 212, to two. In some instances, the notification controller module 212 may determine a z-order level for each copy of the message content of the secondary notification message 318.

At 416, the primary notification module 214 may provide a primary notification message 316 to the graphics device 226 in response to the primary notification trigger message 310, and the secondary notification module 216 may provide at least one secondary notification message 318 to the graphics device 226 in response to the secondary notification trigger message 312 and/or in response to each secondary notification trigger message 312.

In some embodiments, the primary notification module 214 may determine content of the primary notification message 316 based at least in part on the primary notification trigger message 310. For example, the notification controller module 212 may set a flag in the primary notification trigger message 310 to indicate message content or the notification controller module 212 may include the message content in the primary notification trigger message 310. Similarly, in some embodiments, the secondary notification module 216 may determine content of the secondary notification message 318 based at least in part on the secondary notification trigger message 312. For example, the notification controller module 212 may set a flag in the secondary notification trigger message 312 to indicate message content or the notification controller module 212 may include the message content in the secondary notification trigger message 312.

In some embodiments, a secondary notification module, e.g., secondary notification module 216(1), may provide secondary notification messages 318 having a set or fixed first message content, and another secondary notification module, e.g., secondary notification module 216(N), may provide secondary notification messages 318 having a set or fixed second message content. In some instances, the first and the second message content may be the same. In some instances, the first and the second message content may be the different.

At 418, the graphics device 226 may render and/or paint the composite notification message 308. The graphics device 226 may render and/or paint the composite notification message 308 such that message content of the primary notification message 316 overlaps message content of the secondary notification message 318 or vice-versa. In some instances, the overlapping of the message content of the primary notification message 316 and the secondary notification message 318 may be complete such that no portion of the underlying message content is viewable when the composite notification message 308 is provided to the display device 232.

In some instances, graphics device 226 may render and/or paint the composite notification message 308 such that message content of the primary notification message 316 interposes message content of the secondary notification message 318.

In some instances, the primary notification message 316 may cause the graphics device 226 to invoke system calls, scripts, tasks, routines, application program interfaces (APIs), etc. for rendering a portion of a graphical user interface such as a pop-up window and/or user-selection buttons in a memory of the graphics device.

In some instances, the secondary notification message 318 may include a bitmap or a memory address for, or link to, the bitmap. The graphics device 226 may draw the bitmap to a memory of the graphics device 226.

At 420, the graphics device 226 provides the composite notification message 308 to the display device 232 where the composite notification message 308 is displayed to a user.

At 422, the notification controller module 212 determines whether an instance of notification is done. If affirmative, the process continues at 412, and if negative, the process returns to 414.

In some embodiments, the notification controller module 212 may determine, at 422, that an instance of notification is not yet done, but the notification controller module 212 may provide the program module 208 with a resource message 314 to provide the program module 208 with requested resources, at 412, in parallel with or prior to 414.

At 414, the notification controller module 212 may provide an additional primary notification trigger message 310 to the primary notification module 214 and/or may provide one or more additional secondary notification trigger messages 312 to the secondary notification module 216.

In some instances, an instance of notification may occur over multiple refresh cycles of the display device 232. For example, an instance of notification may include a first stage where the display device 232 may display a window with message content therein and a second stage where the display device may display the window with one or more user-input selection buttons.

At 414, the notification controller module 212 may provide an additional primary notification trigger message 310 to the primary notification module 214 such that the one or more user-input selection buttons appear in the window after a threshold amount of time.

Illustrative Display Message

Figure 5:
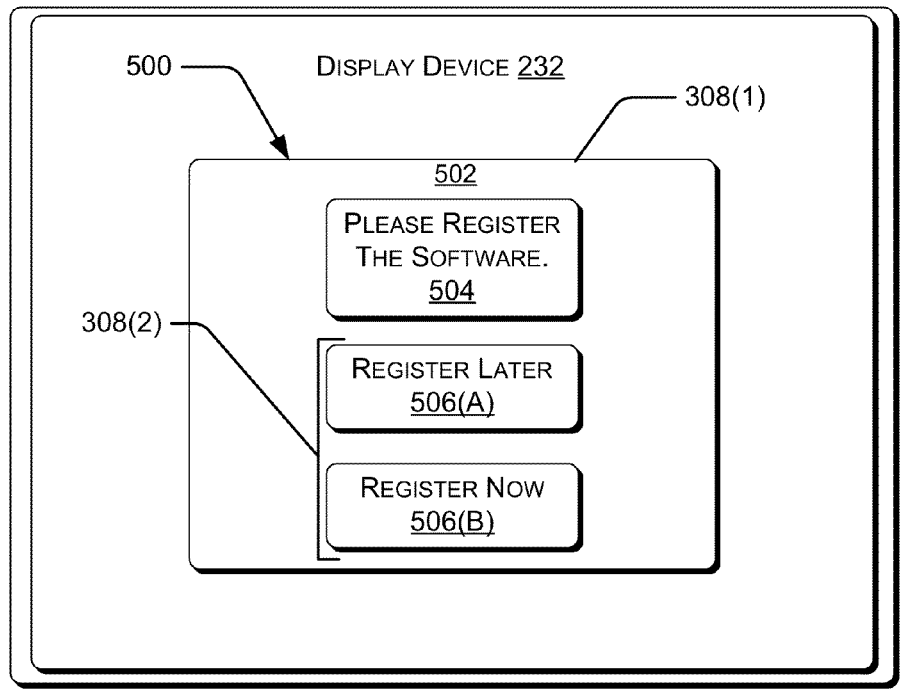
FIG. 5 is a front view of an illustrative display device displaying a hardened notification.

FIG. 5 is an exemplary illustration of a front view of the display device 232 displaying a hardened notification 500. The hardened notification 500 includes composite notification messages 308(1) and 308(2).

The composite notification message 308(1) includes a window 502. In side of the window 502 is message content 504. The message content 504 may be determined by the notification controller module 212. In this exemplary illustration, the program module 208(N) (see FIG. 3) may have sent message 306 for requesting system resources. The notification controller module 212 may have determined that the program module 208(N) has not been registered, and in that case, may have determined to provide a notification with message content 504 "PLEASE REGISTER THE SOFTWARE."

In some instances, the window 502 and message content 504 may be displayed during a first stage of an instance of notification. After a threshold amount of time, the composite notification message 308(2) may displayed during a second stage of the instance of notification and may appear in the window 502. The composite notification message 308(2) may include user-input selection buttons, "REGISTER LATER" 506(A) and "REGISTER NOW" 506(B) (collectively referred to as user-input button(s) 506). After a user selects one of the user-input selection buttons 506, the instance of notification may end and the window 502, the message content 504, and the user-input selection buttons 506 may disappear.

Figures 6A, 6B:
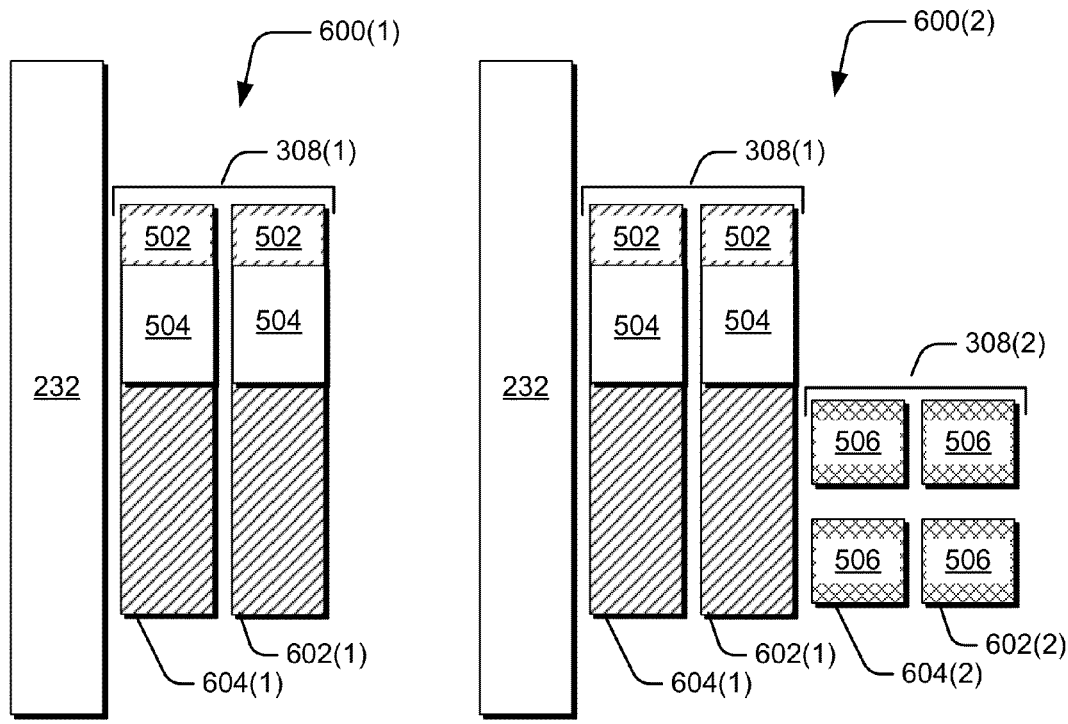
FIGS. 6A and 6B are schematic side view representations of illustrative hardened notifications.

FIGS. 6A and 6B are schematic side view representations of hardened notifications 600(1) and 600(2), respectively.

Referring to FIG. 6A, the hardened notifications 600(1) includes composite notification message 308(1), which may be provided during a first stage of an instance of notification. The composite notification message 308(1) may include a primary notification representation 602(1) and a secondary notification representation 604(1). The graphics device 226 may generate the primary notification representation 602(1) and the secondary notification representation 604(1) based at least in part on a primary notification message 316 and a secondary notification message 318, respectively. For example, the graphics device 226 may draw the primary notification representation 602(1) into a memory of the graphics device 226 based at least in part on the primary notification message 316. In some instances, the secondary notification message 318 may include a bitmap of the secondary notification representation 604(1) and may paint the bitmap into a memory of the graphics device 226.

In this illustrated embodiment, the primary notification representation 602(1) and the secondary notification representation 604(1) have z-order levels such that the primary notification representation 602(1) is above the secondary notification representation 604(1). The primary notification representation 602(1) and the secondary notification representation 604(1) may also be arranged such that they have the same range of X and Y display coordinates, i.e., the primary notification representation 602(1) may completely overlay the secondary notification representation 604(1). The primary notification representation 602(1) and the secondary notification representation 604(1) may each include a drawing of the window 502 and the message content 504.

In some instances, the z-order of the primary notification representation 602(1) and the secondary notification representation 604(1) may be reversed.

In some instances, the primary notification representation 602(1) may interpose a first secondary notification representation 604(1) and a second secondary notification representation 604(1). In some embodiments, the graphics device 226 may generate a first and a second secondary notification representation 604(1) based at least in part on a single secondary notification message 318. In embodiments, the graphics device 226 may generate a first and a second secondary notification representation 604(1) based at least in part on more than one secondary notification message 318.

Referring to FIG. 6B, the composite notification message 308(2) may be provided during a second stage of an instance of notification and may be provided after a threshold amount of time since the composite notification message 308(1) was provided. In the illustrated embodiment, the composite message 308(2) includes a primary notification representation 602(2) and a secondary notification representation 604(2). However, in other embodiments, the composite message 308(2) may include either at least one primary notification representation 602(2) or at least one secondary notification representation 604(2). In yet other embodiments, the composite message 308(2) may include one primary notification representation 602(2) and multiple secondary notification representations 604(2) or multiple primary notification representations 602(2) and one secondary notification representation 604(2).

The graphics device 226 may generate the primary notification representation 602(2) and the secondary notification representation 604(2) based at least in part on a primary notification message 316 and a secondary notification message 318, respectively. In some embodiments, the graphics device 226 may generate the primary notification representation 602(1) and the primary notification representation 602(2) based at least in part on a single primary notification message 316. In other embodiments, the graphics device 226 may generate the primary notification representation 602(1) and the primary notification representation 602(2) based at least in part on more than one primary notification messages 316.

Similarly, in some embodiments, the graphics device 226 may generate the secondary notification representation 604(1) and the secondary notification representation 604(2) based at least in part on a single secondary notification message 318. In other embodiments, the graphics device 226 may generate the secondary notification representation 604(1) and the secondary notification representation 604(2) based at least in part on more than one primary notification messages 316.

In this illustrated embodiment, the primary notification representation 602(2) and the secondary notification representation 604(2) have z-order levels such that the primary notification representation 602(2) is above the secondary notification representation 604(2). The primary notification representation 602(2) and the secondary notification representation 604(2) may also be arranged such that they have the same range of X and Y display coordinates, i.e., the primary notification representation 602(2) may completely overlay the secondary notification representation 604(2). The primary notification representation 602(2) and the secondary notification representation 604(2) may each include a drawing of the user-input selection buttons 506.

In some instances, the z-order of the primary notification representation 602(2) and the secondary notification representation 604(2) may be reversed.

In some instances, the primary notification representation 602(2) may interpose a first secondary notification representation 604(2) and a second secondary notification representation 604(2). In some embodiments, the graphics device 226 may generate a first and a second secondary notification representation 604(2) based at least in part on a single secondary notification message 318. In embodiments, the graphics device 226 may generate a first and a second secondary notification representation 604(2) based at least in part on more than one secondary notification message 318.

It should be noted that if a hacker succeeds in disabling one of the notification modules (e.g., the primary notification module 214) but not the other notification module (e.g., secondary notification module 216), then the hacker is still provided with a notification from the other notification module (e.g., secondary notification module 216). The notification from the other notification module may fool the hacker into believing that the disabled notification module is not actually disabled.

Conclusion

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of providing notifications to a user device, the method comprising:
    providing, in a user-process implemented by the user device, a first notification component that provides a first message having a message content;
    providing, in a different process implemented by the user device, a second notification component that provides a second message having a message content that is the same as the message content of the first message; and
    drawing the first and the second messages one on-top of the other such that a bottom one of the first and the second messages cannot be seen.

2. The method as recited in claim 1, further comprising drawing a third message on-top of the first and the second messages.

3. The method as recited in claim 1, wherein the message content of the first message and the message content of the second message are comprised of identical text.

4. The method as recited in claim 1, further comprising drawing a window of a graphical-user-interface (GUI), wherein the second message is drawn inside of the window.

5. The method as recited in claim 4, wherein the second message is drawn on-top of the first message.

6. The method as recited in claim 1, wherein the different process is a process of an operating system of the user device.

7. The method as recited in claim 1, wherein the first notification component provides global notifications for the user device and the second notification module provides notifications pertaining only to a program module associated with the different process.

8. The method as recited in claim 1, wherein a top one of the first and the second messages and a bottom one of the first and the second messages are aligned such that the top one completely obscures the bottom one.

9. The method as recited in claim 1, further comprising:
    drawing a first set of one or more user-selection buttons associated with the first message;
    drawing a second set of one or more user-selection buttons associated with the second message; and
    based on receiving user selection of an individual user-selection button from one of the first set or the second set of user selection buttons, removing the first message and the second message.

10. A user device, comprising:
    at least one processor;
    at least one storage device;
    a primary notification module stored in the at least one storage device and being executable by the at least one processor to provide a primary notification message having first message content;
    a secondary notification module stored in the at least one storage device and being executable by the at least one processor to provide a secondary notification message having second message content that is the same as the first message content; and
    a graphics device to draw a representation of the first message content and the second message content stacked one on-top of the other such that a bottom one of the first message content and the second message content cannot be seen.

11. The user device as recited in claim 10, wherein the secondary notification module is a first secondary notification module, and the user device further comprising:
    at least a second secondary notification module stored in the at least one storage device and executable by the at least one processor to provide another secondary notification message, wherein the first secondary notification module is encrypted differently than the second secondary notification module.

12. The user device as recited in claim 10, wherein the secondary notification module is a first secondary notification module, and the user device further comprising:
    at least a second secondary notification module stored in the at least one storage device and executable by the at least one processor; and
    at least a first and a second program module stored in the at least one storage device and executable by the at least one processor, wherein the first secondary notification module provides notifications pertaining to the first program module and the second secondary notification module provides notifications pertaining to the second program module.

13. The user device as recited in claim 10, further comprising:
    an operating system stored in the at least one storage device and executable by the at least one processor; and
    a program module stored in the at least one storage device and executable by the at least one processor, wherein the primary notification module resides in the at least one storage device in the operating system and the secondary notification module resides in the at least one storage device in the program module.

14. The user device as recited in claim 10, further comprising:
    a program module stored in the at least one storage device and executed by the at least one processor; and
    a notification controller stored in the at least one storage device and executed by the at least one processor to:
    intercept a resource request message from the program module;

determine whether to provide a notification pertaining to the program module in response to interception of the resource request message; and trigger the primary and the secondary notification modules to provide the primary and the secondary notification messages, respectively, in response to a determination to provide the notification.

15. The user device as recited in claim 14, wherein the notification controller is executable by the at least one processor to further determine a display order for the first message content and the second message content.

16. One or more computer storage media storing computer-executable instructions that, when executed by one or more processors, cause the one or more processors to perform acts comprising:

providing, in a user-process implemented by a first notification module of a user device, a first message having a first message content;

providing, in a different process implemented by a second notification module of the user device, a second message having second message content that is the same as the first message content; and drawing the first and the second messages one on-top of the other such that a bottom one of the first and the second messages cannot be seen.

17. The one or more computer storage media as recited in claim 16, further comprising drawing a third message on-top of the first and the second messages.

18. The one or more computer storage media as recited in claim 16, wherein the first message and the second message are comprised of identical text.

19. The one or more computer storage media as recited in claim 16, further comprising drawing a window of a graphical-user-interface (GUI), wherein the second message is drawn inside of the window.

20. The one or more computer storage media as recited in claim 16, wherein the first notification component provides global notifications for the user device and the second notification module provides notifications pertaining only to a program module associated with the different process.

* * * * *